May 14, 1935.  E. J. FRANWICK  2,001,665
DENTAL BLOWTORCH
Filed July 28, 1932
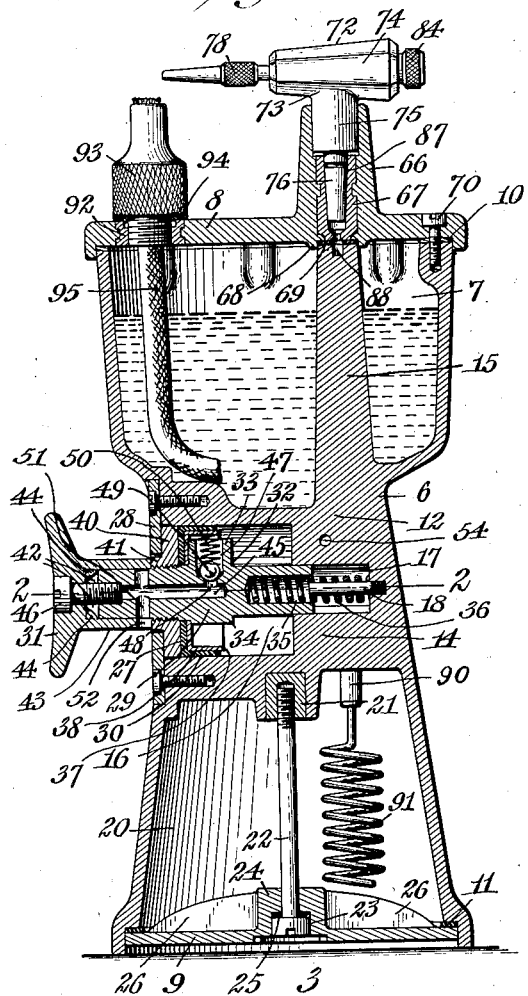
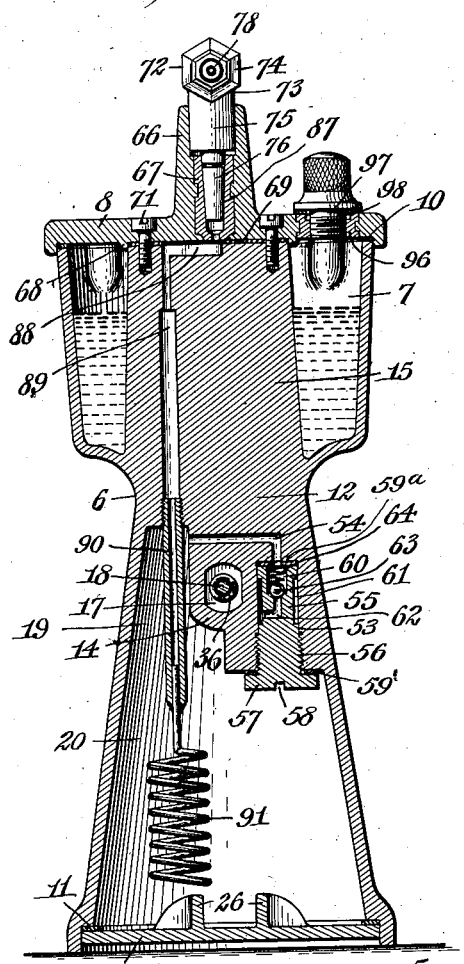
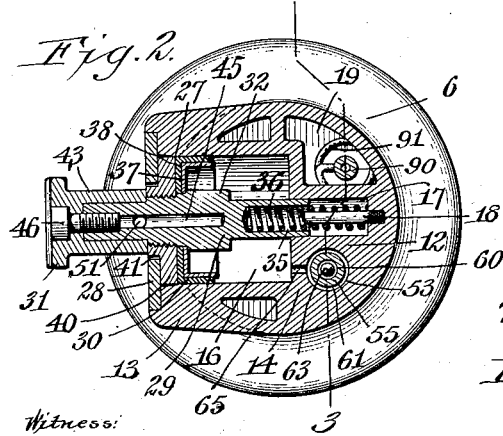
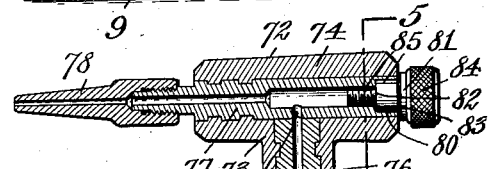
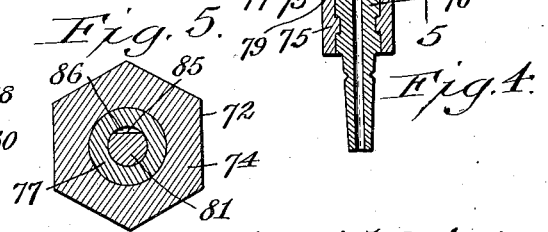
Edmond J. Franwick, Inventor.
By Emil Neuhart, Attorney.
Witness:
J. Oberst.

Patented May 14, 1935

2,001,665

UNITED STATES PATENT OFFICE 2,001,665

DENTAL BLOWTORCH

Edmond J. Franwick, Buffalo, N. Y., assignor to Hanau Engineering Company, Inc., Buffalo, N. Y., a corporation of New York Application July 28, 1932, Serial No. 625,321

12 Claims. (Cl. 158—27.5)

This invention relates to improvements in dental blow torches.

The primary object of the invention is the provision of a dental blow torch, which is simple, inexpensive, and which may be held in working position and manipulated with one hand so that the other is free for use in handling dentures or doing other dental work; the device being devoid of rubber pressure-bulbs or other rubber parts which deteriorate, due to wax and oil dropping upon the same and perspiration of the hand coming in contact therewith while manipulating the bulb; for example, such bulbs as some forms of dental blow torches are provided with for creating pressure and expelling the air through the nozzle of the torch.

Another object is the provision of a dental blow torch having novel means to secure a sustained or intermittently projected flame to be used for various dental operations, and wherein means is embodied to regulate the size of the projected flame, depending on the particular work to be performed in the production, modeling, or remodeling of dental impressions or other dental objects.

Another object is the production of a device of this kind, which is compact, easily manipulated, and capable of use for various purposes, although particularly designed for various kinds of dental operations.

A further object of my invention is the provision of a blow torch having a nozzle capable of being moved out of line with the flame of the torch so that the flame of the torch may be used to warm wax and perform other services; the nozzle, when in such position, preventing wax dripping thereonto when being warmed.

A still further object of my invention is the provision of means allowing various angular changes in the direction of the nozzle so that it may be adjusted relatively to the plane of the pressure-inducing device; thus enabling the nozzle to be positioned in the most convenient position for the user to operate the pressure-inducing device and direct the nozzle toward the object operated upon.

Other objects of my invention reside in the relative sizes of the passages within the nozzle and the relative sizes of the valves controlling such passages, also in the provision of a pressure-inducing device which will create sufficient pressure to enable a continuous flame to issue from the nozzle for a short period of time without manipulating said device; the pressure being built up in the air storage chamber and the pressure-inducing device being capable of storing up air in said chamber by the time the second cycle of movement of the pressure-inducing device has taken place; thus, under constant actuation of the pressure-inducing device, pressure will be built up in the air storage chamber much faster than it is possible to escape from the nozzle.

With the above and other objects in view to appear hereinafter, my invention consists in the novel features of construction, and the novel arrangement and combination of parts to be hereinafter described and more particularly pointed out in the subjoined claims.

In the drawing:

Fig. 1 is a vertical section taken through the blow torch.

Fig. 2 is a horizontal section taken on line 2—2, Fig. 1.

Fig. 3 is a vertical section taken substantially on line 3—3, Fig. 2.

Fig. 4 is a longitudinal vertical section of the air escape nozzle.

Fig. 5 is an enlarged cross section taken on line 5—5, Fig. 4.

Reference being had to the drawing in detail, the numeral 6 designates a body or casing which is comparatively light in weight and may therefore be constructed of any light-weight material, preferably bakelite, hard rubber, or the like. This casing is hollow in the main and somewhat enlarged at its upper end to provide an alcohol or other liquid-fuel chamber 7; its greatest transverse restriction being in a plane directly beneath said fuel chamber, and it preferably flares downwardly from said plane to the base. Both the upper and lower ends of this body or casing are open. A cover or cap 8 is fitted onto its upper open end, and at its lower end it is closed by a removable bottom 9.

In order to render the fuel chamber liquid-tight and air-tight so as to prevent evaporation of the fuel, a gasket 10 is placed between the cover or cap and the upper edge of the wall of the body or casing. The casing is internally shouldered at its lower end to provide a seat for a gasket 11, against which bears the removable bottom 9.

Within the body or casing a block or solid portion 12 is provided which is molded or cast in piece with the wall portions of the casing, and the casing is provided with a lateral extension 13 at one side. The block or solid portion 12 includes a transverse or bridge member 14 which connects opposite portions of the wall of the casing and a vertical member 15 which extends from the transverse or bridge member to the under side of the cap or cover 8; such members being molded, cored out, and/or machined to provide various hollow portions, cavities, and passages.

The transverse or bridge member 14 is hollowed out from the laterally extended side of the casing inwardly to form a plunger cylinder 16 and at its inner end a smaller co-axial bore 17 is provided which has opposite flat sides and in which is axially positioned a spring-alining pin 18, this pin being molded into the casing, threaded therein, or otherwise fastened. The transverse or bridge member 14 is narrowed in rear of the plunger cylinder 16 to provide an upward extension 19 in an air-storage chamber 20 arranged between the transverse or bridge member 14 and the removable bottom 9, the gasket against which said bottom bears serving to render said air-storage chamber, or air chamber as it may be termed, air-tight.

In order to firmly hold the bottom in place against the gasket 11, a metallic socket-nut 21 is molded or otherwise secured in the transverse or bridge member 14, a securing screw 22 being passed axially through the removable bottom, the head thereof being entered in a depression 23 formed in a boss 24 extending axially upwardly from said bottom. A gasket 25 is arranged to surround the securing screw between the head of the latter and the inner wall of said depression. With a view of strengthening said bottom against flexing or breakage, it is internally ribbed, as at 26; thus, when the securing screw 22 is tightened into the nut 21, the gasket 25 will be compressed and prevent leakage of air along the screw. In this manner the air chamber 20 is rendered perfectly air-tight, except as air is allowed to escape through the passages provided therefor in the transverse or bridge wall 14 and the vertical member 15.

Reciprocably arranged within the plunger cylinder 16 is a piston plunger 27, which is arranged to be manually depressed and spring-retrieved. The outer open end of the plunger cylinder is closed by a plunger retainer-plate 28 which has an opening axially disposed therein with reference to the plunger cylinder, through which is passed an extension of the piston plunger, as will presently appear.

The piston plunger comprises a central body portion 29, which may be more particularly referred to as a rod member, a piston head 30 and a handle 31. The rod member 29 is preferably constructed of brass or other suitable metal and provided between its ends with an enlargement 32 in the form of an upward extension 33 and a downward extension 34. The inner portion of the rod member is of a size to fit into the bore 17 at the inner end of the plunger cylinder, opposite sides thereof being flattened so that it conforms in cross section to the cross sectional formation of said bore and thus prevent rotation of said rod member. Said inner portion of the rod member is also axially bored out, as at 35, to receive a helical spring 36 which extends into the bore 17 and surrounds the pin 18 therein, said spring bearing at one end against the inner end of the bore 35 in said rod member and at its other end against the inner wall of the bore 17. The spring is thus confined within the bore 17 and the bore 35 of the rod member, and by reason of its surrounding the pin 18 is prevented from buckling when the piston plunger is moved inwardly within the plunger cylinder 16.

The piston head comprises a metallic cupped-member 37, a correspondingly shaped friction or packing member 38 formed of leather or other suitable material, the circular wall 39 of which surrounds the circular wall of the metallic cupped-member 37, and a retainer disk 40 provided with a hub 41, which extends into the axial opening in the plunger retainer plate 28. The metallic cupped-member 37 and the cupped friction or packing member 38 are slipped over the rod member 29 from its outer end, said metallic cupped-member bearing against the enlargement 32 of said rod member. Said rod member is screw-threaded along a portion of its length and has the retainer disk 40 threaded thereon, said disk serving to clamp the cupped-members 37 and 38 firmly onto the rod member. The portion of the rod member extending outwardly from the screw-threaded portion thereof is smooth faced and has a handle 31 slipped onto it, said handle bearing against the hub 41 of the disk 40, which projects into the axial opening of the plunger retainer plate 28.

The outer end of the rod member 29 is notched at diametrically opposite points, as at 42, and the shank 43 of the handle 31 is provided with an axial bore to receive the outer end of the rod member 29, the inner end wall of this axial bore having lugs 44 adapted to enter the notches 42 in said rod member to prevent turning of the handle.

Extending from the outer end of the rod member inwardly to within a short distance of the bore 35 at the inner end thereof is an axial air-intake passage 45 which is enlarged at its outer end and screw-threaded, and passed axially through the outer end of the handle so as to project into the shank thereof is a securing screw 46, which is threaded into the enlarged outer end portion of said air-intake passage; thus the handle is securely fastened to the rod member 29 of the piston plunger.

The upward extension of the enlargement 32 of the rod member is hollowed out to form a valve-pocket 47, which opens into the plunger cylinder and is provided with a valve seat at its lower or inner end and connected with the air-intake passage 45 by an air-duct 48. Disposed within said valve pocket is a spherical ball valve 49 serving to close the air-duct 48, and arranged in said valve pocket is a helical spring 50 which bears at one end against the spherical valve 49 and at its other end against the circular wall of the metallic cupped-member 37 of the piston head 30, said spring serving to normally retain the valve in closed position. Arranged transversely through the outer portion of the rod member 29 is an air-duct 51, which registers with an air-duct 52 in the shank 43 of the handle 31.

Valve-controlled conduit connection is also maintained between the plunger cylinder 16 and the air chamber 20, and for this purpose the transverse or bridge member 14 is bored out from its bottom upwardly at one side of the bore 17, as at 53. The lower end of this bore is screw-threaded, and connecting the upper end thereof with a high point of the air chamber 20 is an L-shaped air passage 54, one leg of which opens axially into the upper end of this bore.

A valve plug 55 is fitted into said bore 53 and has a screw-threaded portion 56 threaded into the threaded portion of said bore; it being also provided with an enlargement or head 57 at its lower end equipped with a diametral slot 58 to receive a screw-driver or other tool permitting placement within, or detachment of the valve-plug from the bore 53. Between the enlargement or head 57 and the under side of the transverse or bridge member 14 a gasket 59 is arranged, thus preventing leakage of air along said valve-plug. A gasket 59ª is also placed between the inner end of said valve-plug and the inner end wall of said bore.

Formed axially in the upper end of this valve-plug is a valve pocket 60 somewhat larger in diameter than the leg of the L-shaped or angular passage 54, the lower extremity of which opens into said pocket. The valve-plug 55 is reduced in diameter between its ends along a portion of its length to provide an annular air space 61 between it and its surrounding wall, and an L-shaped or angular air passage 62 is formed in the valve-plug. This angular passage is of comparatively small diameter and one leg thereof is axially disposed within the valve-plug and opens into the valve pocket 60, while the other leg thereof is radially arranged within said valve-plug and opens into said annular air space 61.

Within the valve pocket 60 is a spherical valve 63 which normally is seated against the inner end wall of said pocket and closes the upper end of the axially-disposed leg of air passage 62. Arranged within said valve pocket 60 is a helical spring 64 bearing at one end against said spherical valve and at its other end against the inner end wall of the bore 53 around the leg of the L-shaped or angular passage 54 opening into said valve pocket.

As clearly shown in Fig. 2, the annular air space 61 is connected with the inner end of the plunger cylinder 16 by a port or passage 65.

The cover or cup 8 is provided with an integral upwardly-directed boss or extension 66 into which is molded a metallic bushing 67, the upper end of this bushing terminating a distance from the upper end of said boss or extension.

As clearly shown in Fig. 1, the vertical member 15 is tapered upwardly; it being formed comparatively wide in one direction and narrow in the other, yet being completely surrounded with the fuel within the fuel chamber 1. Formed on the under side of the cover or cap 8 is an endless rib 68 which forms an elongated depression to receive the upper end of the vertical member 15. A gasket 69 is arranged within said depression and interposed between the cover or cap 8 and the upper end of said vertical member. The cover or cap is secured to the surrounding wall of the fuel chamber by means of screws 70, and it is also secured to the vertical member 15 by means of screws 71.

Arranged within the boss or extension 66 of the cover or cap is a nozzle member 72, comprising a body portion 73 of T-formation to provide a horizontal member 74 and a vertical or depending member 75 adapted to fit loosely within the upper portion of said boss or extension. This body portion is also constructed of bakelite or similar material, and molded into the vertical or depending portion thereof is a metallic sleeve 76 having a projecting lower portion tapering downwardly from the lower end of the vertical or depending member 75.

Within the horizontal member 74 is a metallic sleeve 77, which projects from one end of said horizontal member and has screw-threaded thereon an air-escape nozzle 78. The passage in the sleeve 77 is connected with the passage of the sleeve 76 by an air duct 79 formed in the wall of the sleeve 77, and the passage through the air-escape nozzle 78 is axially alined with the passage in said sleeve 77. The passage in the sleeve 77 is enlarged at one end, as at 80, it being screw-threaded adjacent said enlarged portion to receive an air-regulating device 81, which is in the form of a regulating screw enlarged along its outer end to form a shoulder 82 which rests against the shoulder 83 in the sleeve formed by enlarging the end of the passage therein. Said regulating screw is provided with a knurled head 84 so that it can be easily adjusted. Both the threaded portion of said regulating screw and the enlargement thereof are flattened at one side along their entire lengths, as at 85, so that an air escape passage 86 is formed between the screw and the surrounding wall of the sleeve 77. Said passage is closed against the escape of air when the shoulder 82 of the screw bears against the shoulder 83 of the sleeve 77. More particularly expressed, this adjusting screw may be termed an air-adjusting valve, since the enlarged portion of the screw serves as a valve and the shoulder 83 in the sleeve 77 as a seat for said valve. The space or passage 86 formed between the flat portions of the screw and the cylindrical wall of the sleeve 77 maintains a definite area regardless of the position of the screw or valve within the sleeve, and the distance the shoulder or valve 82 is spaced from the shoulder or seat 83 determines the amount of air allowed to escape. This air-regulating device provides a double closure against the escape of air; first, by reason of the enlarged portion of the screw, or the valve proper as it may be termed, bearing against the shoulder or valve seat 83 of the sleeve 77 and, secondly, by reason of the head 84 bearing against the end of said sleeve. If desired a gasket may be placed between the head 84 and the end of the adjacent end of the sleeve 77.

The metallic bushing 67 molded into the upwardly-directed boss or extension of the cover is provided with an axially downwardly-tapering bore 87 into which the tapered lower end of the sleeve 76 in the nozzle member is adapted to fit, said nozzle member being thus rotatably fitted in said boss or extension, and by reason of the tapered portion of the sleeve 76 fitting in the tapered bore of the bushing 67, an air-tight connection is made at this point.

Conduit connection is provided between the air chamber 20 and the bushing 67, the latter having the lower end of its bore reduced in diameter and opening through the gasket 69 into a depression 88 formed in the top of the vertical member 15, said depression ranging in the direction of the greatest width of said vertical member, and having a passage 89 opening thereinto which leads downwardly through said vertical member into the air chamber 20.

With a view of retarding the escape of air from the air chamber 20 and to set up friction in the passage of the air to the nozzle member, a tube 90 is threaded into the lower end of the passage 89. Extending into the lower end of this tube is one extremity of a comparatively small tubular coil 91 terminating near the lower end of the air chamber and receiving air from the latter to permit of its passage through said tubular coil, through the tube 90, passage 89, depression 88, into the tapering bore 87 of the bushing 67, and from said bore upwardly through the nozzle, to escape from the outer end of the air-escape nozzle under regulation of the air-regulating device 81.

Molded into the cap or cover at one side thereof, is a metallic bushing 92 into which is threaded a wick-retaining ferrule 93, and between an enlargement of which ferrule and the upper end of said bushing a gasket 94 is arranged, a wick 95 being retained in said wick ferrule and extending downwardly therefrom into the fuel chamber 7.

The cover or cap 8 also has a second metallic bushing 96 molded thereinto in which is threaded a filler plug 97 having an enlarged upper end, between which and the upper end of said bushing 96 a gasket 98 is arranged.

The operation of the device is as follows:

Alcohol or other liquid fuel being supplied to the fuel chamber 7, it is only necessary, in order to place the device in position for use, to grasp the device in one hand, placing the thumb or other portion or portions of the hand against the handle 31 of the piston plunger. Upon depressing the piston plunger 27 against the action of the helical spring 36, air within the plunger cylinder 16 is forced through the port or passage 65 and enters the annular air space around the valve plug 55. From this annular air space the air is directed through the L-shaped or angular air passage 62 in said valve plug, upwardly through the valve pocket 60, from which it enters the L-shaped or angular passage 54 and escapes into the air chamber or air storage chamber 20. From this chamber the air escapes through the tubular coil 91 and passes upwardly through the tube 90, through the passage 89 and the depression 88 connected therewith, and escapes out through the bushing 67, entering the sleeve 76 of the nozzle member. From this sleeve the air passes out through the air-duct 79 and enters the passage in the sleeve 77; escaping from the air-escape nozzle 78. This nozzle, as clearly shown in Fig. 1, terminates at its outer end in close proximity to and at a plane above the outer end of the wick 95, and thus when said wick is lighted directs the flame laterally against a denture or any other object operated upon.

While the torch is held in the hand and pressure relieved from the handle 31, the helical spring 36 will force the piston plunger in an outward direction, and during such action allow air to enter the air-duct 52 in the hollow shank of the handle, which then passes through the air-duct 52 in the rod member of the plunger and along the air-intake passage 45 therein; the inrushing air lifting the spherical valve 49 to allow the air to enter the plunger cylinder so that it may be forced into the air storage chamber 20 in the manner described, and from the latter out through the nozzle 78.

It will be apparent from the foregoing, that by positioning the piston plunger and its receiving cylinder—the pressure-inducing device as it may be termed—between the fuel and air storage chamber, a compact symmetrical torch is produced without connected adjuncts; the torch being one that can be conveniently taken in one hand and easily manipulated, particularly since the axis of the pressure-inducing device is at right-angles to the axis of the complete torch and practically confined within the body portion of the torch. By reason of this arrangement the torch can be grasped in a manner similar to the way the butt of a gun is grasped, and the pressure-inducing device operated with the forefinger of the hand in a manner similar to that of actuating the trigger of a gun. It will be apparent therefore that when grasping the torch in one hand the other is free for use, and the arrangement described enables the operator to direct the flame to the desired point more effectively than would otherwise be possible.

When using the tubular coil 91, which may be termed a restricting tube, the air will enter the air-storage chamber 20 faster than it can escape through the nozzle 78, with the result that the plunger may be operated to build up the pressure in the air-storage chamber to any desired degree within certain limits. This built-up or stored air assures a continuous flow of air from the nozzle 78, so that the flame from the wick 95 is projetced laterally in a constant manner. The amount of pressure under which the air escapes from the nozzle can be easily controlled by the regulating device 81, so that the flame from the wick can be projected to any desired degree, it being simply necessary to slightly unscrew the screw member of said device so as to unseat the shoulder or valve 82 thereof from the shoulder or seat 83 in the sleeve 77, thus allowing part of the air entering said sleeve to escape through the space 86 formed between the screw member of the air regulating device and the wall of the sleeve, which latter serves to form part of the air regulating device. Should an intermittent flame be desired, the piston plunger is manipulated intermittently so as to allow the air accumulating in the air storage chamber to escape therefrom before another charge of air is delivered into the air-storage chamber, or the flame may be projected intermittently by opening the regulating device 81 sufficiently to prevent the building up of the air pressure within the air chamber. An intermittently projected flame can be easily provided by the operator under either of the two methods mentioned for the same.

In view of the fact that the vertical depending member 75 of the air-escape nozzle is loosely fitted into the upper end of the boss or extension 66, this nozzle can be rotated to any desired angle so that its outer or escape end is spaced any desired distance from the flame of the wick, thus permitting the device to be conveniently used for warming or heating wax, and for other purposes; and by reason of the projecting lower portion of the metallic sleeve 76 being tapered and fitting into the tapered bore of the bushing 67, air-tight connection is maintained at all times between these two elements, regardless of the angular position to which the air-escape nozzle may be rotated.

It will also be apparent that changes in construction, and arrangement of parts may be resorted to, and modifications thereof made, without departing from the spirit of my invention as set out in the appended claims.

What I claim is:

1. A dental torch, comprising a casing having a plunger cylinder between its ends with its axis at an angle thereto, an air chamber and a fuel chamber separated by said plunger cylinder, a piston plunger within said plunger cylinder, conduit connection between said plunger cylinder and said air chamber, an air-escape nozzle, conduit connection between said air chamber and said air-escape nozzle, and means for maintaining a flame in the path of the air escaping from said nozzle.

2. A dental torch, comprising a casing having a plunger cylinder between its ends with its axis at an angle thereto, an air chamber and a fuel chamber separated by said plunger cylinder, a piston plunger within said cylinder, conduit connection between said plunger cylinder and said air chamber, an air-escape nozzle, conduit connection between said air chamber and said air-escape nozzle including means to restrict the passage of air to said nozzle at a pressure below that at which air is forced into said air chamber under manipulation of said piston plunger, and means for maintaining a flame in the path of the air escaping from said nozzle.

3. A dental torch, comprising a casing having pressure-inducing means therein with its axis at an angle to the axis of said casing, an air chamber, and a fuel chamber separated from said air chamber by said pressure-inducing means, an air-escape nozzle without said casing, and a passage in communication with said pressure-inducing means and leading to said nozzle, said passage having a portion diminished in size from at least another portion thereof.

4. A dental torch, comprising a casing having a plunger cylinder therein at a right angle to the axis thereof and formed integral therewith, a piston plunger reciprocably arranged within said plunger cylinder and having an operating element projecting from said casing, an air-escape nozzle without said casing having conduit connection with said plunger cylinder, and means for maintaining a flame in the path of the air escaping from said nozzle.

5. A dental torch, comprising a casing having a plunger cylinder formed therein with its axis at an angle to the axis of said casing and wholly confined within the walls of said casing, a piston plunger within said cylinder manually depressible and automatically retrievable, an air-escape nozzle extending from said casing and having conduit connection with said plunger cylinder, and means for maintaining a flame in the path of the air escaping from said nozzle.

6. A dental torch, comprising a casing having a solid portion between its ends connecting the wall thereof at opposite points and providing a fuel chamber thereabove and an air chamber therebelow, said casing being open at the top and bottom, a removable closure member for closing the bottom of said casing, a removable cover closing the top of said casing, pressure-inducing means disposed within said solid portion and having an operating element extending out through said casing, an air-escape nozzle mounted on said cover, conduit connection between said air chamber and said pressure-inducing means and between said air chamber and said air-escape nozzle, and means for maintaining a flame in the path of the air escaping from said nozzle.

7. A dental torch, comprising a casing having a bridge wall between its ends and a vertical member extending upwardly from said bridge wall, said bridge wall and casing forming a fuel chamber thereabove and an air chamber therebelow, said bridge wall having a plunger cylinder therein, a piston plunger mounted for reciprocation in said plunger cylinder, a valve-controlled air passage in said wall leading from said plunger cylinder to said air chamber, a nozzle member mounted on said casing, said bridge wall and vertical member having a passage extending therethrough leading from said air chamber to said nozzle member, and means for maintaining a flame in the path of the air escaping from said nozzle member.

8. A dental torch, comprising a casing having a bridge wall between its ends and a fuel chamber above said bridge wall, said casing being open at the bottom, a removable closure member applied to the open bottom of said casing in an air-tight manner and establishing an air chamber between the same and said bridge wall, a securing element passed through said bottom and extending upwardly into said bridge wall, pressure-inducing means arranged within said bridge wall, an air-escape nozzle mounted on the top of said casing, conduit connection between said air chamber and said pressure-inducing means and between said air chamber and said air-escape nozzle, and means for maintaining a flame in the path of the air escaping from said nozzle.

9. A dental torch, comprising a casing having a fuel chamber and an air chamber spaced apart, a plunger cylinder within said casing separating said fuel chamber from said air chamber, a piston plunger in said plunger cylinder having an operating element extending outwardly from said casing, a valve-controlled passage wholly within said casing connecting said plunger cylinder with said air chamber, an air-escape nozzle exteriorly applied to said casing, conduit connection between said air chamber and said air-escape nozzle, and means for maintaining a flame in the path of the air escaping from said nozzle.

10. A dental torch having an air-escape nozzle provided with a passage enlarged at one end to form an outwardly-facing shoulder and screw-threaded adjacent said enlarged end, the opposite end of said passage being utilized for directing a current of air against a flame, and an air regulating device comprising an adjustable screw entered in the screw threaded portion of said passage and having an enlargement forming an inwardly-facing shoulder, the enlargement of said screw being entered in the enlargement of said passage and the inwardly-facing shoulder of said screw being adapted to bear against the outwardly-facing shoulder of said passage, the screw-threaded portion of said screw and the enlargement thereof being cut away at one side to form an air-escape between said screw and the wall of said passage, said screw having a head at its outer end.

11. A dental torch, comprising an exterior boss provided with a bore therethrough opening to the interior of said torch and having said bore tapered along a portion of its length, and an air-escape nozzle having a portion loosely fitted into said boss and being provided with a tapered extension beneath said loosely fitted portion entered into the tapered portion of the bore in said boss, said nozzle being maintained in air-tight position within said boss by the frictional fit of the tapered portion thereof within the tapered portion of the bore of said boss.

12. A dental torch, comprising a casing wholly enclosing a fuel chamber and a plunger cylinder, a piston plunger reciprocable within said plunger cylinder and provided with an operating element extending outwardly from said casing at an angle thereto, an air-escape nozzle having conduit connection with said plunger cylinder, and means for maintaining a flame in the path of the air escaping from said nozzle.

EDMOND J. FRANWICK.